United States Patent [19]

Iwasaki et al.

[11] 4,371,437
[45] Feb. 1, 1983

[54] FUEL SEDIMENTATION DEVICE

[75] Inventors: Hiroyuki Iwasaki, Urawa; Kiyoshi Kasahara, Asaka, both of Japan

[73] Assignee: Honda Giken Kogyo Kabushiki Kaisha, Tokyo, Japan

[21] Appl. No.: 243,435

[22] Filed: Mar. 13, 1981

[30] Foreign Application Priority Data

Mar. 15, 1980 [JP] Japan .............................. 55-33850[U]

[51] Int. Cl.$^3$ ............................................. B01D 21/00
[52] U.S. Cl. ...................................... 210/94; 210/172; 210/223; 210/521
[58] Field of Search ............... 210/168, 172, 222, 223, 210/294, 320, 416.4, 521, 532.1, 94, 95

[56] References Cited

U.S. PATENT DOCUMENTS

| | | | |
|---|---|---|---|
| 1,602,935 | 10/1926 | Rasey | 210/223 |
| 2,624,463 | 1/1953 | Freese | 210/172 |
| 2,646,884 | 7/1953 | Findley | 210/94 |
| 2,690,842 | 10/1954 | Spluvak | 210/222 |
| 2,926,787 | 3/1960 | Combest | 210/223 |
| 4,295,969 | 10/1981 | Hagberg | 210/223 |
| 4,312,751 | 1/1982 | Casamitjana | 210/94 |

FOREIGN PATENT DOCUMENTS

| | | | |
|---|---|---|---|
| 554870 | 3/1958 | Canada | 210/222 |
| 987503 | 3/1965 | United Kingdom | 210/532.1 |
| 1503343 | 3/1978 | United Kingdom | 210/172 |

Primary Examiner—Peter A. Hruskoci
Attorney, Agent, or Firm—Armstrong, Nikaido, Marmelstein & Kubovcik

[57] ABSTRACT

A fuel strainer having a strainer cup into which fuel is introduced from an upper side of the strainer cup, and a partition assembly removably fitted in the strainer cup. The partition assembly includes a base plate having a magnet attached to a lower side thereof, and at least one partition plate connected to an upper side of the base plate through a plurality of supporting columns so as to divide the space in the strainer cup into an upper and a lower chambers. The partition plate has a passage bore for connection between the upper and lower chambers and an upper surface of the partition plate constitutes a sediment guiding surface descending toward the passage bore. When the inside of the strainer cup is agitated for any reason, the sedimented impurities, irrespective of whether they are magnetic or non-magnetic, are effectively confined within the lower chamber by the cooperation of the attraction effect of the magnet and the partitioning effect of the partition plate so that the mixing of the sediment impurities into the fuel flowing in the strainer is effectively prevented.

5 Claims, 2 Drawing Figures

FUEL SEDIMENTATION DEVICE

BACKGROUND OF THE INVENTION

1. Field of the Invention

The present invention relates to a fuel sedimentation device disposed in a fuel passage between, for example, a fuel tank and an engine, for sedimenting and removing impurities in the fuel.

2. Description of the Prior Arts

In the conventional fuel sedimentation devices of the kind mentioned above, there is a fear that, due to a vibration transmitted from the exterior or an increase of the flow rate of the fuel, the fuel within the sedimentation cup is agitated to cause the sedimented impurities to float up to be mixed again with the fuel flowing through the cup.

SUMMARY OF THE INVENTION

It is, therefore, an object of the invention to provide a fuel sedimentation device for purifying liquid having a simple construction capable of overcoming the above-described problem of the prior art.

According to the present invention, there is provided a fuel sedimentation device which comprises a sedimentation cup into which fuel is introduced from an upper side of the cup, and partition means adapted to vertically divide a space in the strainer cup into at least two, upper and lower chambers. The partition means has a passage bore for connection between the upper and lower chambers, and a sediment guiding upper surface descending toward the passage bore.

With this arrangement, impurities contained in fuel in the fuel sedimentation device are sedimented downward along the sediment guiding upper surface and through the passage bore in the partition means into the lower chamber. Even if the sedimented impurities are agitated, the partition means acts to effectively keep the impurities from floating up into the upper chamber so as to prevent the remixing of the impurities with the fuel flowing into the fuel sedimentation device, thus ensuring the intended function of the device.

A base plate is disposed in the lower chamber on the bottom of the sedimentation cup and has a magnet attached to a lower side thereof so that impurities of magnetic nature such as iron rust stored in the lower chamber are securely held therein under the magnetic attraction of the magnet. The partition means is connected to an upper side of the base plate through a plurality of supporting columns so that the partition means and the base plate are removable as an integral unit from the sedimentation cup to permit an easy cleaning of the partition assembly itself and of the inside of the cup as well.

The above and other objects, features and advantages of of the invention will be better understood from the ensuing detailed description of the invention when read in conjunction with the accompanying drawings which illustrate a presently preferred embodiment of the invention.

DESCRIPTION OF THE PREFERRED EMBODIMENT

Figure 1:
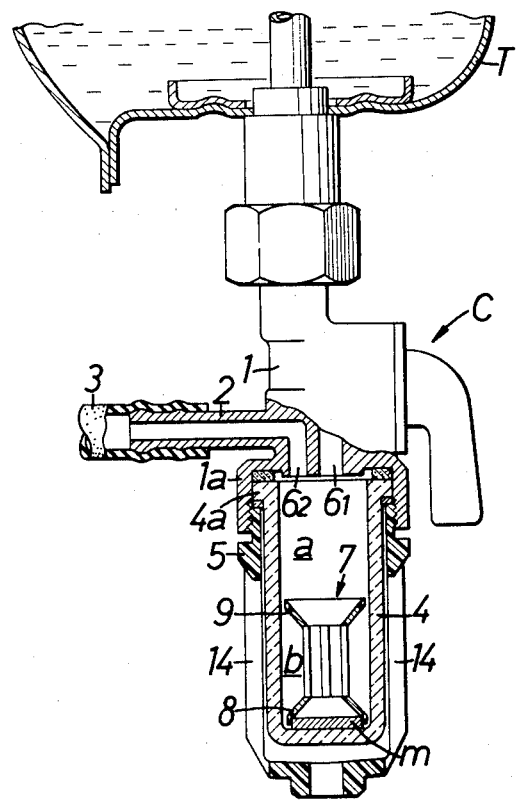
FIG. 1 is a sectional side elevational view of an essential part of preferred embodiment of the invention.
Figure 2:
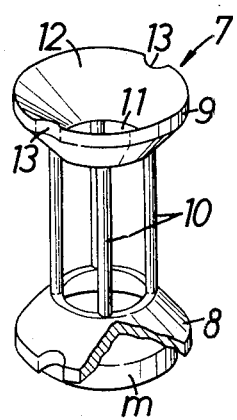
FIG. 2 is a perspective view of a partition assembly of the embodiment as shown in FIG. 1.

A preferred embodiment of the invention will be described hereinunder with reference to the attached drawings. A fuel tank T of a motorcycle is provided at its bottom with a cock C which is known per se. A fuel conduit 3 leading to the carburetor of an engine (not shown) is connected to a fuel delivery pipe 2 projecting laterally from the body 1 of the cock. The cock C is operable to close the passage between the fuel tank T and the fuel conduit 3.

Integrally formed with the cock body 1 at the lower end thereof is sedimentation cup mounting sleeve 1a to which detachably screwed is a cup-shaped protecting cover 5 accommodating a sedimentation cup 4 made of transparent glass. The cover 5 cooperates with the mounting sleeve 1a in clamping therebetween a mounting flange 4a formed at the upper end of the cup 4. A fuel inlet passage $6_1$ leading to a valve in the cock C and a fuel outlet passage $6_2$ leading to the fuel delivery pipe 2 are open in the upper opening of the cup 4.

A partition assembly 7 is removably placed in the cup 4. The partition assembly 7 includes a base plate 8 and a partition plate 9 which is connected to the upper side of the base plate 8 through a plurality of supporting columns 10 having the same length. A magnet m is attached to the lower side of the base plate 8. The partition plate 9 as a whole has a funnel-like form with a passage bore 11 formed at the center thereof. The upper face of the partition plate 9 descends toward the central passage bore 11 to constitute a sediment guiding surface 12, while bubble relieving notches 13 are formed in the periphery of the partition plate 9. The base plate 8 and the partition plate 9 are formed in symmetry with each other so that they are interchangeable when produced. Thus, the base plate 8 with the magnet m is seated on the bottom of the sedimentation cup 4, while the partition plate 9 divides the space in the cup into an upper chamber a and a lower chamber b. A reference numeral 14 designates an observation window formed in the protecting cover 5.

In operation, as the cock C is opened, the fuel in the fuel tank T flows into the cup 4 through the inlet passage $6_1$ via the valve portion of the cock C. Meanwhile, water, iron rust particles and other impurities or contaminants move downward in the upper chamber a to reach the partition plate 9 and are guided toward the passage bore 11 along the sediment guiding surface 12 and are sedimented onto the bottom of the lower chamber b through the passage bore 11. The magnetic materials such as rust in the sediment are attracted by the magnet m.

On the other hand, the fuel from which the impurities have been separated flows upwardly into the outlet passage $6_2$ and is then delivered to the carburetor of the engine through the delivery pipe 2 and the conduit 3.

During running of the vehicle, the inside of the sedimentation cup 4 is agitated by the vibration or due to the fuel flowing therein at a high speed to cause nonmagnetic impurities not attracted by the magnet m to float up. Most of these floated impurities, however, are checked by the partition plate 9 and held in the lower chamber b. Therefore, the impurities once sedimented are never mixed again with the fuel flowing through the cup 4.

The above-explained effect of preventing the sedimented impurities from floating up will be enhanced by employing a plurality of partition plates 9 arranged in a vertical manner so as to divide the space in the cup 4 into a plurality of smaller sections.

The state of sedimentation of impurities within the sedimentation cup 4 can be observed from the outside through the observation window 14 in the protecting cover 5. When a predetermined amount of sedimented impurities has been stored in the cup 4, the cup 4 is demounted for the cleaning. The cleaning of the inside of the cup 4 and the partition assembly 7 is facilitated because the partition assembly 7 can be removed from the inside of the cup 4.

What is claimed is:

1. A sedimentation device for purifying liquid comprising a sedimentation cup having an inlet and an outlet formed at its top, and a partition means for vertically dividing the interior of said cup into at least two, upper and lower chambers, said partition means comprising a partition plate in the form of a funnel having a passage bore formed centrally therethrough and a sediment-guiding surface descending toward said passage bore, and a base plate in the form of a funnel symmetrical with said partition plate, disposed on the bottom of said sedimentation cup and connected with said partition plate through a plurality of supporting columns and in said base plate having a magnet attached to the lower side thereof.

2. A sedimentation device according to claim 1 wherein said partition means are removably received in said sedimentation cup.

3. A sedimentation device according to claim 1, wherein said sedimentation cup is formed of transparent glass.

4. A sedimentation device according to claim 1, wherein said sedimentation cup is secured to the lower end of a cock connected to a fuel tank.

5. A sedimentation device according to claim 1 or 4, wherein said sedimentation cup is connected at its inlet with an inlet passage leading to a fuel tank and at its outlet with an outlet passage leading to a fuel delivery pipe.

* * * * *